(12) United States Patent
Kenmotsu

(10) Patent No.: US 12,020,109 B2
(45) Date of Patent: Jun. 25, 2024

(54) WRITING DEVICE AND DESTINATION MANAGEMENT SYSTEM

(71) Applicant: TOSHIBA TEC KABUSHIKI KAISHA, Tokyo (JP)

(72) Inventor: Takahide Kenmotsu, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 156 days.

(21) Appl. No.: 17/869,676

(22) Filed: Jul. 20, 2022

(65) Prior Publication Data

US 2023/0058804 A1 Feb. 23, 2023

(30) Foreign Application Priority Data

Aug. 23, 2021 (JP) ................. 2021-135732

(51) Int. Cl.
*G06K 7/10* (2006.01)
(52) U.S. Cl.
CPC ................. *G06K 7/10366* (2013.01)
(58) Field of Classification Search
CPC ............ G06K 7/10366; G06K 17/00
See application file for complete search history.

(56) References Cited

U.S. PATENT DOCUMENTS

| | | | | |
|---|---|---|---|---|
| 2006/0049944 | A1* | 3/2006 | Ishiguro | G06Q 10/087 340/572.1 |
| 2015/0357887 | A1* | 12/2015 | Yamazaki | H02P 31/00 318/490 |
| 2018/0285811 | A1* | 10/2018 | Shaw | G06Q 10/0833 |

FOREIGN PATENT DOCUMENTS

JP 2006-085637 A 3/2006

* cited by examiner

*Primary Examiner* — Jamara A Franklin
(74) *Attorney, Agent, or Firm* — FOLEY & LARDNER LLP

(57) ABSTRACT

A writing device is provided to prevent or substantially reduce an occurrence of inconsistency in a destination even when a specification of an apparatus is changed after packaging. According to one embodiment, the writing device includes a first command processor and a second command processor. The first command processor commands a first wireless tag attached to an apparatus to rewrite specification information that is stored in the first wireless tag and that shows a specification of the apparatus. The second command processor commands a second wireless tag attached to a package of the apparatus to rewrite destination information that is stored in the second wireless tag and that relates to a destination of the apparatus, in response to a command given by the first command processor being executed.

11 Claims, 4 Drawing Sheets

WRITING DEVICE AND DESTINATION MANAGEMENT SYSTEM

CROSS-REFERENCE TO RELATED APPLICATION

This application is based upon and claims the benefit of priority from Japanese Patent Application No. 2021-135732, filed on Aug. 23, 2021, the entire contents of which are incorporated herein by reference.

FIELD

Embodiments described herein relate generally to a writing device and a destination management system.

BACKGROUND

Typically, control processing may be changed based on information stored in a wireless tag attached to an apparatus, and a specification of the apparatus can be changed by rewriting the information stored in the wireless tag.

DETAILED DESCRIPTION

In control processing of a typical apparatus, the specification can be changed even after packaging, but when a place of destination is displayed in a package or the like at the time of packaging, the specification after change may not be a specification suitable for the place of destination displayed in the package. In view of such a circumstance, it may be desired to be able to prevent an occurrence of inconsistency in the destination, which can be confirmed from the outside of the package, even when the specification of the apparatus is changed after the packaging.

In general, according to one embodiment, a writing device and a destination management system are provided that can prevent an occurrence of inconsistency in a destination, which can be confirmed from the outside of a packaging box, even when a specification of an apparatus is changed after packaging.

According to an embodiment, a writing device includes a first command unit or first command processor and a second command unit or second command processor. The first command unit commands a first wireless tag attached to an apparatus to rewrite specification information that is stored in the first wireless tag and that shows a specification of the apparatus. The second command unit commands a second wireless tag attached to a package of the apparatus to rewrite destination information that is stored in the second wireless tag and that relates to a destination of the apparatus, when a command given by the first command unit is executed. The writing device may include one processor or multiple processors.

Figure 1:
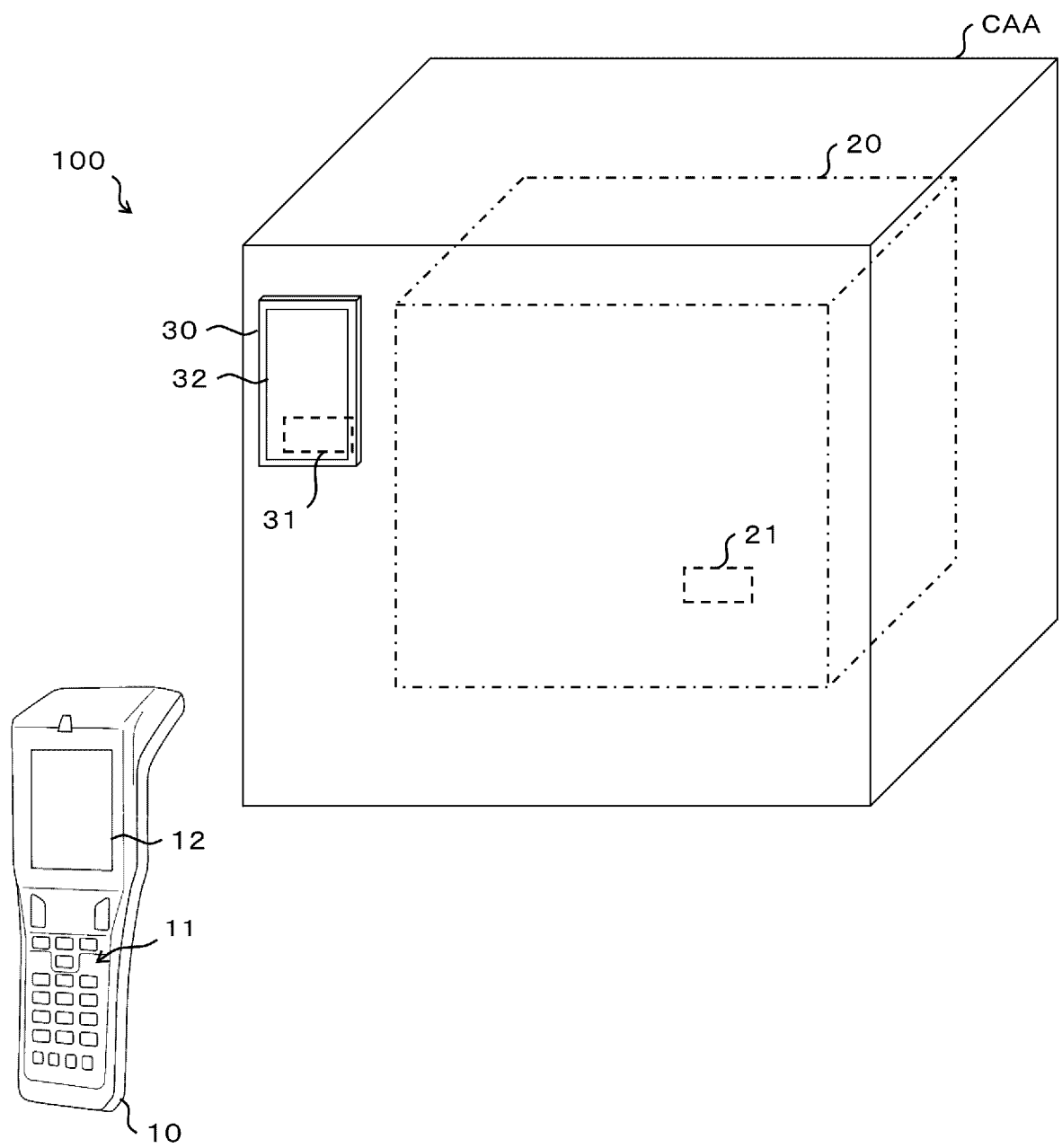
FIG. 1 is a perspective view showing a schematic configuration of a destination management system according to an embodiment.

Hereinafter, an example of an embodiment will be described with reference to the drawings. FIG. 1 is a perspective view showing a schematic configuration of a destination management system according to one embodiment. An external shape and a size shown in FIG. 1 are schematic exemplifications, and do not faithfully represent an actual shape and an actual size. A destination management system 100 according to the embodiment includes a reader and writer 10, an apparatus 20, and an electronic invoice 30. The destination management system may include one processor or multiple processors.

The apparatus 20 is a device that operates under electrical control. The apparatus 20 is, for example, a multifunction peripheral. However, the apparatus 20 may be any apparatus as long as the apparatus has a function of changing a specification by a change in control. The apparatus 20 includes a radio frequency identification (RFID) tag 21. The RFID tag 21 stores data related to an operation of the apparatus 20. The data stored in the RFID tag 21 includes at least specification information to be described later. The data stored in the RFID tag 21 may be read from the outside. The RFID tag 21 wirelessly receives a rewriting command from the outside and rewrites the stored data. The RFID tag 21 corresponds to a first wireless tag.

The electronic invoice 30 is attached to an outer surface of a packaging box CAA in which the apparatus 20 is packaged, and displays information for notifying an operator involved in transportation of the apparatus 20. The electronic invoice 30 includes an RFID tag 31 and an electronic paper 32. The RFID tag 31 stores data related to the transportation of the apparatus 20. The data stored in the RFID tag 31 includes at least destination information related to a place of destination of the apparatus 20. The data stored in the RFID tag 31 can be read from the outside. The RFID tag 31 wirelessly receives a rewriting command from the outside and rewrites the stored data. The RFID tag 31 corresponds to a second wireless tag. The electronic paper 32 is a display device for the display described above.

The reader and writer 10 reads data stored in various RFID tags including the RFID tag 21 and the RFID tag 31 by wireless communication with the RFID tags. The reader and writer 10 rewrites data stored in the various RFID tags including the RFID tag 21 and the RFID tag 31 via a rewriting command by the wireless communication. Thus, the reader and writer 10 has a function of serving as a writing device. The reader and writer 10 includes an operation unit or operation processor 11 and a display unit or display 12. The operation unit 11 includes, for example, an operation device such as a plurality of key switches, e.g., serving as an interface for receiving an input. With the operation unit 11, an operator inputs various instructions. The display unit 12 includes a display device such as a liquid crystal display, and displays a screen for notifying the operator of various kinds of information.

The reader and writer 10 shown in FIG. 1 is a handheld type that is used by being held by the operator. However, the reader and writer 10 may be of any type, such as a stationary type that is used in a stationary state, or a type that is used while being mechanically moved.

Figure 2:
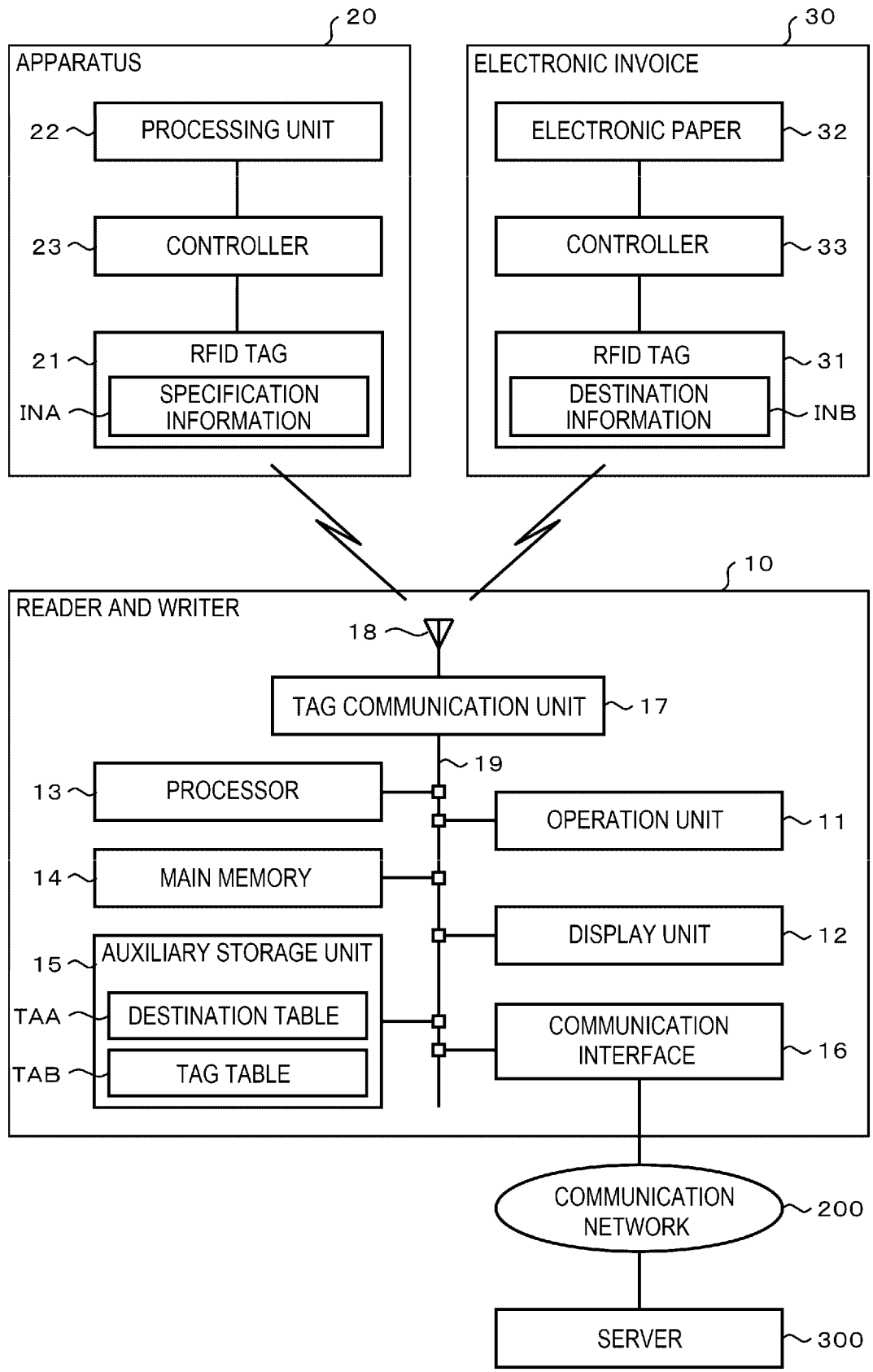
FIG. 2 is a block diagram showing a main circuit configuration.

FIG. 2 is a block diagram showing a main circuit configuration of the destination management system 100. In FIG. 2, the same elements as those shown in FIG. 1 are denoted by the same reference numerals, and a detailed description thereof will be omitted. The reader and writer 10 includes, in addition to the operation unit 11 and the display unit 12, a processor 13, a main memory 14, an auxiliary storage unit or auxiliary storage 15, a communication interface 16, a tag communication unit or tag communication processor 17, an antenna 18, and a transmission path 19. The operation unit 11, the display unit 12, the processor 13, the main memory 14, the auxiliary storage unit 15, the communication interface 16, and the tag communication unit 17 are connected via the transmission path 19. Some elements such as the antenna 18 may not be provided in the reader and writer 10 and may be externally attached.

The processor 13, the main memory 14, and the auxiliary storage unit 15 are connected by the transmission path 19 to constitute a computer that performs information processing. The processor 13 corresponds to a central part of the computer. The processor 13 executes information processing for controlling the reader and writer 10 in accordance with an operating system, middleware, and an information processing program such as an application program.

The main memory 14 corresponds to a main storage portion of the computer. The main memory 14 includes a non-volatile memory area and a volatile memory area. The main memory 14 stores the information processing program in the non-volatile memory area. The main memory 14 may store data necessary for the processor 13 to execute processing for controlling each unit in the non-volatile or volatile memory area. The main memory 14 uses the volatile memory area as a work area in which the processor 13 appropriately rewrites data.

The auxiliary storage unit 15 corresponds to an auxiliary storage portion of the computer. As the auxiliary storage unit 15, for example, storage devices such as an electric erasable programmable read-only memory (EEPROM), a hard disc drive (HDD), and a solid state drive (SSD) can be used individually or in combination. The auxiliary storage unit 15 stores data, which is to be used when the processor 13 performs various types of processing, and data generated by the processing in the processor 13. The auxiliary storage unit 15 stores information processing programs. One of the information processing programs stored in the auxiliary storage unit 15 is an information processing program that describes destination change processing to be described later. The information processing program may be implemented as an independent application program, or may be implemented as, for example, a part of another information processing program for operation control of the reader and writer 10. A part of a storage area of the auxiliary storage unit 15 is used to store a destination table TAA and a tag table TAB to be described later.

The communication interface 16 executes communication processing for performing data communication via a communication network 200. As the communication interface 16, for example, an existing communication device (e.g., a communication interface) for the Internet can be used. A partner of the data communication using the communication interface 16 is, for example, a server 300 that performs information processing for shipping management of an apparatus manufactured in a factory or the like. The tag communication unit 17 executes communication processing for wireless communication with various RFID tags including the RFID tag 21 and the RFID tag 31. The antenna 18 is connected to the tag communication unit 17. The antenna 18 radiates, as a radio wave, a transmission signal output from the tag communication unit 17. The antenna 18 provides, to the tag communication unit 17, an electric signal corresponding to a radio wave that propagates through space and reaches the antenna 18. The transmission path 19 includes an address bus, a data bus, a control signal line, and the like, and transmits data and a control signal exchanged between the connected units.

The apparatus 20 includes a processing unit or processing circuitry 22 and a controller 23 in addition to the RFID tag 21. The processing unit 22 includes various processing units constituting a main body of the apparatus 20. The apparatus 20 is configured to implement various necessary functions by an operation of the processing unit 22. When the apparatus 20 is the multifunction peripheral, the processing unit 22 includes, for example, a scan unit or scanner, a print unit or printer, a facsimile unit or facsimile machine, and the like. The scan unit reads a document and generates image data of an image shown on the document. The print unit prints the image indicated by the image data on a recording sheet. The facsimile unit performs various types of processing for performing image communication in accordance with a facsimile standard via a communication network (not shown) such as a public switched telephone network (PSTN). At least a part of the units provided in the processing unit 22 can selectively apply a plurality of operation states, and is adapted to a plurality of specifications. For example, a plurality of combinations of a position and a number of a binding hole can be selected for a hole punch unit or hole puncher that is provided in the print unit or printer and that forms the binding hole in a sheet to be output after printing.

The controller 23 controls the operation of the processing unit 22. The controller 23 reads specification information INA stored in the RFID tag 21, and controls at least a part of the units provided in the processing unit 22 to operate in an operation state according to a specification indicated by the specification information INA.

The electronic invoice 30 includes a controller 33 in addition to the RFID tag 31 and the electronic paper 32. The controller 33 reads information stored in the RFID tag 31, and displays, on the electronic paper 32, an invoice screen that is based on the information. It is assumed that the invoice screen is, for example, a screen showing information similar to that written on an invoice of a paper medium that has long been used in a related art. The invoice screen shows at least information that enables a person to determine a place of destination based on destination information INB. Thus, the electronic invoice 30 is an example of a display device that displays based on the destination information stored in the RFID tag 31 serving as the second wireless tag.

Figure 3:
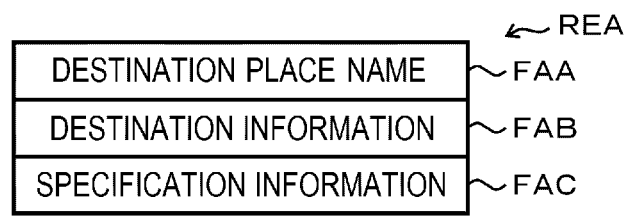
FIG. 3 is a diagram schematically showing a data structure of a data record provided in a destination table in FIG. 2.

FIG. 3 is a diagram schematically showing a data structure of a data record REA in the destination table in FIG. 2. The destination table TAA is a set of the data records REA that are associated with a plurality of places of destination, respectively.

The data record REA includes fields FAA, FAB, and FAC. In the field FAA, a destination place name, which is a name assigned to an associated place of destination, is set. The destination place name is, for example, "Japan", or "North America". In the field FAB, an identifier of the associated place of destination is set as the destination information. In the field FAC, an identifier of a standard specification or the like for using the apparatus 20 at the associated place of destination is set as the specification information.

The destination table TAA is predetermined based on a sales policy or the like of a manufacturer or the like of the apparatus 20. The destination table TAA, for example, is written in the auxiliary storage unit 15 under an instruction of an operator when the operator performs initial setting work or maintenance work before starting to use the reader and writer 10. The processor 13 may download data stored in the server 300 at a timing when a predetermined condition is satisfied, for example, at regular time intervals, and may write the data in the destination table TAA in the auxiliary storage unit 15.

Figure 4:
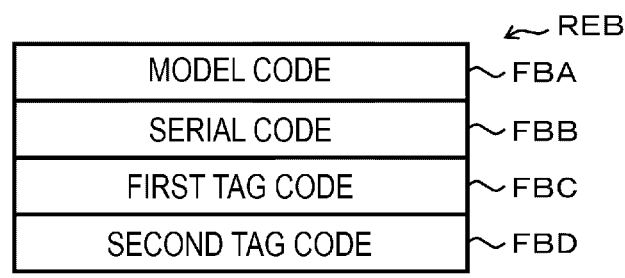
FIG. 4 is a diagram schematically showing a data structure of a data record provided in a tag table in FIG. 2.

FIG. 4 is a diagram schematically showing a data structure of a data record REB in the tag table TAB in FIG. 2. The tag table TAB is a set of data records REB that are associated with a plurality of apparatuses 20 and a plurality of other apparatuses of the same type as the apparatus 20. An apparatus of the same type as the apparatus 20 includes an RFID tag and has a function of changing a specification according to specification information stored in the RFID tag.

The data record REB includes fields FBA, FBB, FBC, and FBD. In the field FBA, a model code serving as an identifier of a model of an associated apparatus is set. That is, the model code corresponding to the model of the apparatus 20 is set in the field FBA of the data record REB associated with the apparatus 20. In the field FBB, a serial code serving as an individual identifier of the associated apparatus is set. That is, in the field FBB of the data record REB associated with the apparatus 20, a serial code assigned to the apparatus 20 is set. In the field FBC, a first tag code serving as an identifier of an RFID tag provided in the associated apparatus is set. That is, in the field FBC of the data record REB associated with the apparatus 20, a tag code assigned to the RFID tag 21 is set as the first tag code. In the field FBD, a second tag code is set as an identifier of an RFID tag provided in an electronic invoice attached to a packaging box that packages the associated apparatus. That is, in the field FBD of the data record REB associated with the apparatus 20, a tag code assigned to the RFID tag 31 is set as the second tag code.

The tag table TAB is generated by, for example, the server 300 in association with apparatus packaging work, and is sequentially updated. Alternatively, the tag table TAB may be downloaded from the server 300 or the like at a timing when a predetermined condition is satisfied, for example, at regular time intervals, and may be written in the auxiliary storage unit 15.

Next, an operation of the destination management system 100 configured as described above will be described. Contents of the various types of processing to be described below is merely an example, and a change in an order of a part of the processing, omission of a part of the processing, an addition of another type of processing, or the like can be appropriately performed.

The place of destination of the apparatus 20 is determined in accordance with, for example, a manufacturing plan. Then, for example, as a part of the manufacturing work of the apparatus 20, the specification information related to the standard specification in the place of destination is written in the RFID tag 21. At this time, a method of writing the specification information in the RFID tag 21 is optional. As a part of the packaging work or the shipping work of the apparatus 20, the electronic invoice 30 is attached to the packaging box CAA, and the destination information related to the place of destination is written in the RFID tag 31. At this time, a method of writing the destination information in the RFID tag 31 may be optional. The writing of the destination information in the RFID tag 31 may be performed before attaching the electronic invoice 30 to the packaging box CAA.

For example, when it is necessary to change the place of destination of the apparatus 20 in the shipping work, the operator sets an operation mode of the reader and writer 10 to a destination change mode. Accordingly, the processor 13 executes destination change processing in accordance with the information processing program stored in the auxiliary storage unit 15. Although the following destination change processing is described for the case of changing the place of destination of the apparatus 20, the apparatus to be processed is not limited to the apparatus 20, and the same applies to a case of changing a place of destination of another apparatus.

Figure 5:
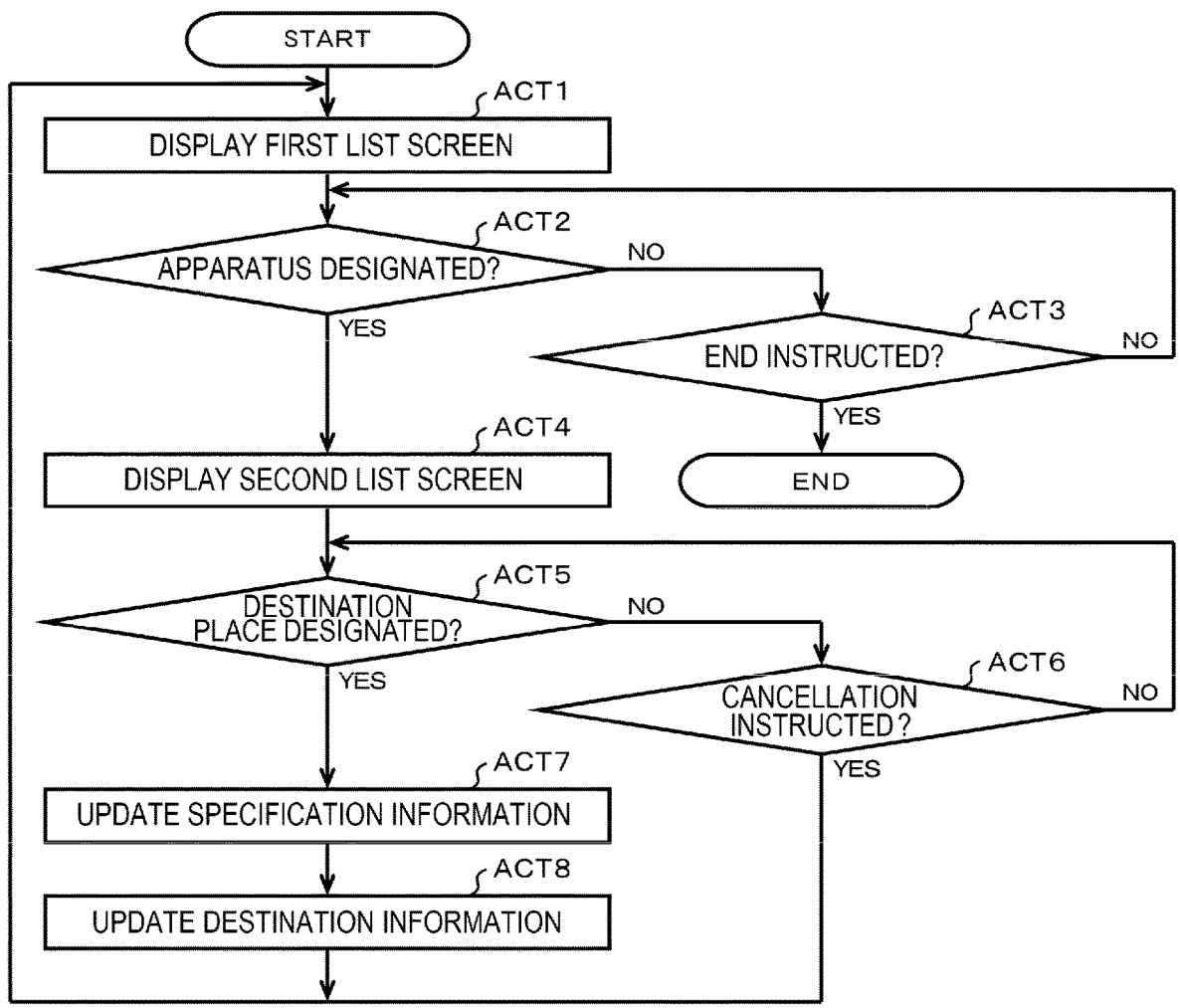
FIG. 5 is a flowchart of destination change processing by a processor shown in FIG. 2.

FIG. 5 is a flowchart of the destination change processing performed by the processor 13. In ACT 1, the processor 13 causes the display unit 12 to display a first list screen. The first list screen is a screen showing a list of a plurality of apparatuses including the apparatus 20. For example, the processor 13 generates the first list screen as a screen that shows, in a predetermined form, a list of apparatuses that are associated with the data records REB in the tag table TAB respectively.

In ACT 2, the processor 13 confirms whether an apparatus to be a destination change target is designated. When this event cannot be confirmed, the processor 13 determines NO and proceeds to ACT 3. In ACT 3, the processor 13 confirms whether an end of the destination change is instructed. When this event cannot be confirmed, the processor 13 determines NO, and returns to ACT 2. Thus, in ACT 2 and ACT 3, the processor 13 waits for an apparatus designation or an end instruction.

After finding the apparatus 20 from the first list screen, the operator designates the apparatus 20 by, for example, a predetermined operation on the operation unit 11. In response to this, the processor 13 assumes that the apparatus is designated, determines YES in ACT 2, and proceeds to ACT 4. In ACT 4, the processor 13 causes the display unit 12 to display a second list screen. The second list screen is a screen showing a list of candidates for the place of destination of the apparatus 20. The processor 13 causes the display unit 12 to display the second list screen based on, for example, screen data stored in the auxiliary storage unit 15 in advance. Alternatively, for example, the processor 13 may generate the second list screen as a screen that shows, in a predetermined form, a list of destinations that are associated with the data records REA in the destination table TAA respectively.

In ACT 5, the processor 13 confirms whether the place of destination is designated. When this event cannot be confirmed, the processor 13 determines NO, and proceeds to ACT 6. In ACT 6, the processor 13 confirms whether cancellation of the apparatus to be the destination change target is instructed. When this event cannot be confirmed, the processor 13 determines NO, and returns to ACT 5. Thus, in ACT 5 and ACT 6, the processor 13 waits for a designation of the place of destination or a cancellation instruction.

When changing the place of destination of the apparatus to be the destination change target, that is, the apparatus 20 herein, the operator finds a place of destination to be changed to from the second list screen, and designates the place of destination by, for example, a predetermined operation on the operation unit 11. In response to this, the processor 13 determines YES in ACT 5 and proceeds to ACT 7.

In ACT 7, the processor 13 updates the specification information stored in the RFID tag attached to the apparatus to be the destination change target, that is, the RFID tag 21 herein. For example, the processor 13 finds the data record REB associated with the apparatus to be the destination change target from the tag table TAB, and determines a tag code of the RFID tag 21 as the first tag code set in the field FBC of the found data record REB. The processor 13 finds the data record REA associated with the designated place of destination from the destination table TAA. The processor 13 sends a command to the RFID tag 21 having the determined tag code to rewrite the specification information set in the field FAC of the found data record REA. The RFID tag 21 rewrites the stored specification information INA according to the command. Thus, the processor 13 executes information processing that is based on an information processing program, so that the computer including the processor 13 as the central part determines the first identifier as the first tag code indicated in the data record REB associated with the apparatus designated by the operator, and functions as a first determination unit or first determination processor. Further, the computer having the processor 13 as the central part commands rewriting in a wireless tag identified by the first identifier determined by the first determination unit, and functions as a first command unit or first command processor.

In ACT 8, the processor updates the destination information stored in the RFID tag provided in the electronic invoice attached to the packaging box in which the apparatus to be the destination change target is packaged, that is, the RFID tag 31 herein. For example, the processor 13 finds, from the tag table TAB, the data record REB in which the tag code of the RFID tag provided in the apparatus to be the destination change target is set in the field FBC as the first tag code. The processor 13 sends a command to the RFID tag identified by the second tag code set in the field FBD of the found data record REB, that is, the RFID tag 31 herein, to rewrite the destination information set in the field FAB of the data record REA found in ACT 7. The RFID tag 31 rewrites the stored destination information INB according to the command. Thus, the processor 13 executes the information processing that is based on the information processing program, so that the computer including the processor 13 as the central part acquires the second identifier as the second tag code associated with the first tag code determined as the first identifier in the data record REB, and functions as an acquisition unit or receiver. The computer including the processor 13 as the central part determines the place of destination according to an instruction from the operator, and functions as a second determination unit or second determination processor. The computer including the processor 13 as the central part commands the wireless tag identified by the second identifier acquired by the function as the acquisition unit or receiver to rewrite the destination information to show the place of destination determined by the second determination unit, and functions as a second command unit.

In the electronic invoice 30, the controller 33 reads the destination information INB stored in the RFID tag 31, and displays, on the electronic paper 32, an invoice screen that is based on the destination information INB. Therefore, when the destination information INB stored in the RFID tag 31 is rewritten as described above, the controller 33 updates the screen of the electronic paper 32 to the invoice screen that is based on the rewritten destination information INB. When ACT 8 is ended, the processor 13 returns to ACT 1, returns the display of the display unit 12 to the first list screen, and then enters a standby state of ACT 2 and ACT 3.

When the operator does not change the place of destination of the apparatus designated once, the operator instructs cancellation by, for example, a predetermined operation on the operation unit 11 during the display of the second list screen. In response to this, the processor 13 determines YES in ACT 6, and returns to ACT 1 without executing ACT 7 and ACT 8.

When the operator finishes changing the place of destination, the operator instructs an end by a predetermined operation on the operation unit 11 in a state where the first list screen is displayed on the display unit 12, for example. In response to this, the processor 13 determines YES in ACT 3 and ends the destination change processing.

As described above, accompanying a change in the place of destination of the apparatus 20, the reader and writer 10 updates the specification information stored in the RFID tag 21 attached to the apparatus 20 to the specification information showing the specification corresponding to the place of destination after the change. The reader and writer 10 updates the destination information stored in the RFID tag 31 provided in the electronic invoice 30 attached to the packaging box CAA of the apparatus 20, to the destination information showing the place of destination after the change. Therefore, even though the specification of the apparatus is changed after the packaging, it is possible to prevent an occurrence of inconsistency in the place of destination that can be confirmed from the outside of the packaging.

The embodiment can be variously modified as follows. At least one of the destination table TAA and the tag table TAB may not be stored in the auxiliary storage unit 15, and may be acquired from, for example, the server 300 by the processor 13 as appropriate.

The destination information may be read from the RFID tag 31 by the reader and writer 10 or another reader, and a screen enabling the place of destination to be confirmed in accordance with the destination information may be displayed on the reader and writer 10 or another reader or another information terminal.

In place of the electronic paper 32, various other display devices may be used.

A part or all of the functions implemented by the processor 13 by the information processing may be implemented by hardware such as a logic circuit that executes information processing that is not based on a program. Each of the functions may be implemented by combining software control with hardware such as the logic circuit.

While certain embodiments have been described, these embodiments have been presented by way of examples only, and are not intended to limit the scope of the disclosure. Indeed, these novel embodiments may be embodied in a variety of other forms; furthermore, various omissions, substitutions, and changes in the form of the embodiments may be made without departing from the spirit of the disclosure. These embodiments and the modification thereof are included in the scope and the spirit of the disclosure and are also included in the claims and an equivalent scope thereof.

What is claimed is:
1. A writing device, comprising:
a first command processor configured to command a first wireless tag attached to an apparatus to rewrite specification information that is stored in the first wireless tag and that shows a specification of the apparatus; and
a second command processor configured to command a second wireless tag attached to a package of the apparatus to rewrite destination information that is stored in the second wireless tag and that relates to a destination of the apparatus, in response to a command given by the first command processor being executed.

2. The device according to claim 1, further comprising:
a first determination processor configured to determine a first identifier according to an instruction from an operator; and
a receiver configured to acquire a second identifier associated with the first identifier determined by the first determination processor, wherein
the first command processor commands rewriting of a wireless tag, as the first wireless tag, identified by the first identifier determined by the first determination processor, and
the second command processor commands rewriting of a wireless tag, as the second wireless tag, identified by the second identifier acquired by the receiver.

3. The device according to claim 1, further comprising:
a second determination processor configured to determine a destination according to an instruction from an operator, wherein
the first command processor commands the first wireless tag to rewrite the specification information to show the specification associated with the destination determined by the second determination processor, and
the second command processor commands the second wireless tag to rewrite the destination information to show the destination determined by the second determination processor.

4. The device according to claim 1, wherein the writing device is configured to communicate with a display to display information based on the destination information stored in the second wireless tag.

5. A destination management system, comprising:
a first wireless tag attached to an apparatus;
a second wireless tag attached to a package including the apparatus; and
a writing device, comprising:
a first command processor configured to command the first wireless tag to rewrite specification information that is stored in the first wireless tag and that shows a specification of the apparatus, and
a second command processor configured to command the second wireless tag to rewrite destination information that is stored in the second wireless tag and that relates to a destination of the apparatus, in response to a command given by the first command processor being executed.

6. The system according to claim 5, further comprising:
a display configured to display information based on the destination information stored in the second wireless tag.

7. A method for operating a writing device, the method comprising:
commanding, by a first command processor, a first wireless tag configured to be attached to an apparatus to rewrite specification information that is stored in the first wireless tag and that shows a specification of the apparatus; and
commanding, by a second command processor, a second wireless tag configured to be attached to a package of the apparatus to rewrite destination information that is stored in the second wireless tag and that relates to a destination of the apparatus, in response to a command given by the first command processor being executed.

8. The method according to claim 7, further comprising:
determining, by a first determination processor, a first identifier according to an instruction from an operator;
acquiring, by a receiver, a second identifier associated with the first identifier determined by the first determination processor;
commanding, by the first command processor, rewriting of a wireless tag, as the first wireless tag, identified by the first identifier determined by the first determination processor; and
commanding, by the second command processor, rewriting of a wireless tag, as the second wireless tag, identified by the second identifier acquired by the receiver.

9. The method according to claim 7, further comprising:
determining, by a second determination processor, a destination according to an instruction from an operator;
commanding, by the first command processor, the first wireless tag to rewrite the specification information to show the specification associated with the destination determined by the second determination processor; and
commanding, by the second command processor, the second wireless tag to rewrite the destination information to show the destination determined by the second determination processor.

10. The method according to claim 7, further comprising:
displaying information based on the destination information stored in the second wireless tag.

11. The method according to claim 7, further comprising:
attaching the first wireless tag to the apparatus; and
attaching the second wireless tag to the package including the apparatus.

* * * * *